United States Patent
Göransson et al.

(10) Patent No.: US 9,392,616 B2
(45) Date of Patent: *Jul. 12, 2016

(54) HARQ IN SPATIAL MULTIPLEXING MIMO SYSTEM

(71) Applicant: Telefonaktiebolaget L M Ericsson (publ), Stockholm (SE)

(72) Inventors: Bo Göransson, Sollentuna (SE); Per Johan Torsner, Masaby (FI); Stefan Parkvall, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 81 days.

This patent is subject to a terminal disclaimer.

(21) Appl. No.: 13/937,091

(22) Filed: Jul. 8, 2013

(65) Prior Publication Data

US 2013/0301620 A1   Nov. 14, 2013

Related U.S. Application Data

(63) Continuation of application No. 13/246,530, filed on Sep. 27, 2011, now Pat. No. 8,498,246, which is a continuation of application No. 12/447,522, filed as application No. PCT/SE2007/050782 on Oct. 26, 2007, now Pat. No. 8,102,805.

(30) Foreign Application Priority Data

Oct. 31, 2006   (SE) ...................... 0602300

(51) Int. Cl.
*H04W 4/00*   (2009.01)
*H04W 72/12*   (2009.01)
(Continued)

(52) U.S. Cl.
CPC ............. *H04W 72/1284* (2013.01); *H04L 1/06* (2013.01); *H04L 1/1822* (2013.01);
(Continued)

(58) Field of Classification Search
None
See application file for complete search history.

(56) References Cited

U.S. PATENT DOCUMENTS 6,127,971 A   10/2000   Calderbank et al.
7,047,473 B2   5/2006   Hwang et al.
(Continued)

FOREIGN PATENT DOCUMENTS

EP   1294120 A1   3/2003
EP   1298829 A1   4/2003
(Continued)

OTHER PUBLICATIONS

3GPP, "Number of HARQ Channels." 3GPP TSG-RAN WG1 Meeting #46bis, Seoul, Korea, Oct. 9-13, 2006, R1-062597, pp. 1-7.
(Continued)

*Primary Examiner* — Anh-Vu Ly
(74) *Attorney, Agent, or Firm* — Coats & Bennett, PLLC

(57) ABSTRACT

A method and apparatus for signaling scheduling information in a spatial multiplexing wireless communications system, as well as corresponding methods and apparatus for processing such signaling information, are disclosed. Signaling scheduling information includes scheduling first and second transport blocks for simultaneous transmission during a first transmission interval on first and second data substreams, respectively, and assigning a single re-transmission process identifier for the first transmission interval and transmitting first scheduling information for the first transmission interval. The first scheduling information includes the re-transmission process identifier and first disambiguation data. Additionally, at least one of the first and second transport blocks is scheduled for re-transmission during a second transmission interval. Second scheduling information for the second transmission interval is also transmitted; the second scheduling information including the re-transmission process identifier and second disambiguation data.

12 Claims, 7 Drawing Sheets

(51) Int. Cl.
*H04L 1/06* (2006.01)
*H04L 1/00* (2006.01)
*H04L 1/18* (2006.01)

(52) U.S. Cl.
CPC ........... *H04L 1/1887* (2013.01); *H04L 1/1896* (2013.01); *H04L 1/0003* (2013.01); *H04L 1/0007* (2013.01); *H04L 1/0009* (2013.01); *H04L 1/1812* (2013.01)

(56) References Cited

U.S. PATENT DOCUMENTS

| | | | |
|---|---|---|---|
| 7,391,755 B2 | 6/2008 | Gopalakrishnan et al. | |
| 7,392,460 B2 | 6/2008 | Kim et al. | |
| 7,400,616 B2 | 7/2008 | Saito et al. | |
| 7,519,022 B2 | 4/2009 | Yu et al. | |
| 7,532,600 B2 | 5/2009 | Hu et al. | |
| 7,551,589 B2 | 6/2009 | Kim et al. | |
| 7,616,698 B2 | 11/2009 | Sun et al. | |
| 7,684,372 B2 | 3/2010 | Beale et al. | |
| 7,698,616 B2 | 4/2010 | Onggosanusi et al. | |
| 7,764,743 B2 | 7/2010 | Farag | |
| 7,796,561 B2 | 9/2010 | Kim et al. | |
| 7,826,871 B2 | 11/2010 | Sudo | |
| 7,916,745 B2 | 3/2011 | de Carvalho | |
| 7,924,776 B2 | 4/2011 | Yoon et al. | |
| 7,995,512 B2 | 8/2011 | Kim et al. | |
| 8,059,609 B2 | 11/2011 | Kim et al. | |
| 8,102,805 B2* | 1/2012 | Goransson et al. | 370/329 |
| 8,165,593 B2 | 4/2012 | Kim et al. | |
| 8,194,696 B2 | 6/2012 | McBeath et al. | |
| 8,300,582 B2 | 10/2012 | Malladi et al. | |
| 8,300,722 B2 | 10/2012 | Mo et al. | |
| 8,305,943 B2 | 11/2012 | Khandekar et al. | |
| 8,325,859 B2 | 12/2012 | Okino et al. | |
| 8,331,342 B2 | 12/2012 | Khan et al. | |
| 8,345,641 B2 | 1/2013 | Yokoyama | |
| 8,363,624 B2 | 1/2013 | Blanz et al. | |
| 8,385,273 B2 | 2/2013 | Harada et al. | |
| 8,416,872 B2 | 4/2013 | Higuchi et al. | |
| 8,483,141 B2 | 7/2013 | Malkamaki et al. | |
| 8,498,246 B2* | 7/2013 | Goransson et al. | 370/328 |
| 8,503,555 B2 | 8/2013 | Kim et al. | |
| 8,526,527 B2 | 9/2013 | Duan et al. | |
| 8,553,624 B2 | 10/2013 | Khan et al. | |
| 8,578,230 B2 | 11/2013 | Nanda | |
| 8,601,336 B2 | 12/2013 | Ohta et al. | |
| 8,625,601 B2 | 1/2014 | Gholmieh et al. | |
| 8,645,782 B2 | 2/2014 | Lee et al. | |
| 8,712,347 B2 | 4/2014 | Dateki et al. | |
| 8,879,511 B2 | 11/2014 | Agrawal et al. | |
| 2001/0002904 A1 | 6/2001 | Proctor | |
| 2003/0074476 A1 | 4/2003 | Kim et al. | |
| 2003/0128705 A1 | 7/2003 | Yi et al. | |
| 2003/0147348 A1* | 8/2003 | Jiang | 370/229 |
| 2004/0062221 A1 | 4/2004 | Gopalakrishnan et al. | |
| 2004/0233887 A1 | 11/2004 | Meiling et al. | |
| 2004/0268206 A1 | 12/2004 | Kim et al. | |
| 2005/0078665 A1 | 4/2005 | Yu et al. | |
| 2006/0068825 A1 | 3/2006 | Iochi | |
| 2006/0114813 A1 | 6/2006 | Seki et al. | |
| 2006/0209813 A1 | 9/2006 | Higuchi et al. | |
| 2007/0153672 A1 | 7/2007 | Terry et al. | |
| 2007/0177569 A1 | 8/2007 | Lundby | |
| 2007/0189235 A1 | 8/2007 | Chandra et al. | |
| 2007/0190951 A1 | 8/2007 | Lampinen et al. | |
| 2007/0195809 A1 | 8/2007 | Blanz et al. | |
| 2008/0031218 A1 | 2/2008 | Shimizu | |
| 2008/0123583 A1 | 5/2008 | Shiizaki et al. | |
| 2008/0229168 A1 | 9/2008 | Murakami et al. | |
| 2009/0028261 A1 | 1/2009 | Zhang et al. | |
| 2009/0028263 A1 | 1/2009 | Yu et al. | |
| 2009/0042519 A1 | 2/2009 | Sudo | |
| 2009/0093265 A1 | 4/2009 | Kimura et al. | |
| 2009/0175369 A1 | 7/2009 | Atarashi et al. | |
| 2009/0213955 A1 | 8/2009 | Higuchi et al. | |
| 2009/0279589 A1 | 11/2009 | Nguyen | |
| 2010/0023830 A1 | 1/2010 | Wengerter et al. | |
| 2010/0143265 A1 | 6/2010 | Hewes et al. | |
| 2010/0146353 A1 | 6/2010 | Lim et al. | |
| 2011/0243265 A1 | 10/2011 | Dateki et al. | |

FOREIGN PATENT DOCUMENTS

| | | |
|---|---|---|
| EP | 1339187 A2 | 8/2003 |
| EP | 1404048 A1 | 3/2004 |
| EP | 1672818 A1 | 6/2006 |
| EP | 1788742 A1 | 5/2007 |
| EP | 1833228 A1 | 9/2007 |
| EP | 2048807 A2 | 4/2009 |
| EP | 2518921 A1 | 10/2012 |
| WO | 02087108 A1 | 10/2002 |
| WO | 2005099125 A1 | 10/2005 |
| WO | 2006046894 A1 | 5/2006 |
| WO | 2006057195 A1 | 6/2006 |
| WO | 2006070465 A1 | 7/2006 |
| WO | 2006071049 A1 | 7/2006 |
| WO | 2006080317 A1 | 8/2006 |
| WO | 2006101213 A1 | 9/2006 |
| WO | 2006106613 A1 | 10/2006 |
| WO | 2006130742 A1 | 12/2006 |
| WO | 2007053840 A1 | 5/2007 |
| WO | 2007091605 A1 | 8/2007 |
| WO | 2007092258 A1 | 8/2007 |
| WO | 2007108624 A2 | 9/2007 |
| WO | 2008022329 A2 | 2/2008 |
| WO | 2008125923 A1 | 10/2008 |

OTHER PUBLICATIONS

3GPP, "Downlink Multiplexing." 3GPP TSG-RAN WG1 Meeting #46bis, Seoul, Korea, Oct. 9-13, 2006, R1-062921, pp. 1-8.

3GPP, "System Operation of SU-MIMO and MU-MIMO." 3GPP TSG-RAN WG1 #46, Tallinn, Estonia, Aug. 28-Sep. 1, 2006, R1-062043, pp. 1-6.

3GPP, "Description of Single and Multi Codeword Schemes with Precoding." 3GPP TSG-RAN WG1 #44, Denver, CO, USA, Feb. 13-17, 2006, R1-060457, pp. 1-9.

Zhang, G. et al., "Reduction of Signaling Overhead in Wireless Communication Systems", U.S. Appl. No. 60/952,091, filed Jul. 26, 2007, pp. 1-13.

Khan, F. et al., "Asynchronous Hybrid Arq Process Indication in a MIMO Wireless Communication System", U.S. Appl. No. 60/960,709, filed Oct. 10, 2007, pp. 1-17.

Blanz, J. et al., "Signaling Transport Format and Resource Allocation per Data Stream in MIMO Systems", U.S. Appl. No. 60/775,898, filed Feb. 22, 2006, pp. 1-8.

Das, A. et al., "Adaptive, Asynchronous Incremental Redundancy (A2IR) With Fixed Transmission Time Intervals (TTI) for HSDPA", 2002, pp. 1-5.

Dekorsy, A., "A Cutoff Rate based Cross-Layer Metric for MIMO-HARQ Transmission", 2005 IEEE 16th International Symposium on Personal, Indoor and Mobile Radio Communications, pp. 2166-2170.

Ajib, W. et al., "Data Link Control for Multiple Input Multiple Output Wireless Systems", 2005 Wireless Telecommunications Symposium, pp. 112-119.

Philips, "Fallback mode for Rel-7 FDD MIMO scheme", 3GPP TSG RAN WG1 Meeting #46, Aug. 28-Sep. 1, 2006, pp. 1-3, Tallinn, Estonia, Tdoc R1-061952.

Nokia, "HS-SCCH performance for HSDPA MIMO", 3GPP TSG-RAN WG1 Meeting #47, Nov. 6-10, 2006, pp. 1-6, Riga, Latvia, R1-063331.

Philips, "HS-SCCH signalling for Rel-7 FDD MIMO scheme", 3GPP TSG RAN WG1 Meeting #46, Aug. 28-Sep. 1, 2006, pp. 1-4, Tallinn, Estonia, Tdoc R1-061953.

Zheng, H et al, "Multiple ARQ Processes for MIMO Systems", EURASIP Journal on Applied Signal Processing, 2004, pp. 772-782, Hindawi Publishing Corporation.

(56) References Cited

OTHER PUBLICATIONS

Ericsson, "On UTRA MIMO", 3GPP TSG-RAN WG1 Meeting #46, Aug. 28-Sep. 1, 2006, pp. 1-3, Tallinn, Estonia, R1-062259.

Nokia, "Signalling needs for MIMO and UTRA", 3GPP TSG-RAN WG1 Meeting #46, Aug. 28-Sep. 1, 2006, pp. 1-3, Tallinn, Estonia, R1-062246.

Samsung, "Dynamic Switching between Single and Multi-User MIMO", 3GPP TSG RAN WG1 Meeting #45, May 8-12, 2006, pp. 1-8, Shanghai, China, R1-061323.

Das, A. et al., "A2IR: An Asynchronous and Adaptive Hybrid ARQ Scheme for 3G Evolution", 2001, pp. 628-632, IEEE.

Kolding, T. et al., "Performance Aspects of WCDMA Systems with High Speed Downlink Packet Access (HSDPA)", 2002, pp. 477-481, IEEE.

Peisa, J. et al., "High Speed Packet Access Technologies Evolution—Concept and Technologies", 2007, pp. 819-824, IEEE.

NTT DOCOMO et al., "AMC and HARQ Using Frequency Domain Channel-dependent Scheduling in MIMO Channel Transmission", 3GPP TSG RAN WG1 #42 on LTE, Aug. 29-Sep. 2, 2005, pp. 1-8, London, UK, R1-050942.

Motorola, "E-UTRA Uplink Control Channel Design and TP", 3GPP TSG RAN1#44, Feb. 13-17, 2006, pp. 1-4, Denver, US, R1-060403.

Motorola, "Downlink Acknowledgement and Group Transmit Indicator Channels", 3GPP RSG RAN1#45, May 8-12, 2006, pp. 1-4, Shanghai, China, R1-061165.

Motorola, "Uplink Control Signaling Considerations for E-UTRA", 3GPP TSG RAN1#45, May 8-12, 2006, pp. 1-4, Shanghai, China, R1-061468.

Motorola, "Segmentation and ACK/NACK Signaling for LTE", 3GPP TSG RAN WG1#45, May 8-12, 2006, pp. 1-7, Shanghai, China, R1-061473.

Qualcomm Europe, "HS-SCCH in support of D-TxAA", 3GPP TSG-RAN WG1 #46, Aug. 28-Sep. 1, 2006, pp. 1-7, Tallin, Estonia, R1-062032.

Motorola, "Segmentation and ACK/NACK Signaling for LTE", 3GPP TSG-RAN WG1 #46, Aug. 28-Sep. 1, 2006, pp. 1-10, Tallin, Estonia, R1-062084.

Philips et al., "Agreements on details in support of MIMO (FDD) for Rel-7", 3GPP TSG-RAN WG1 #46, Aug. 28-Sep. 1, 2006, pp. 1-3, Tallin, Estonia, R1-062437.

Samsung, "Downlink Hybrid ARQ Signaling", 3GPP TSG RAN WG1 Meeting #46bis, Oct. 9-13, 2006, pp. 1-4, Seoul, South Korea, R1-062533.

LG Electronics, "Downlink control signaling", 3GPP TSG RAN WG1 Meeting #46bis, Oct. 9-13, 2006, pp. 1-7, Seoul, South Korea, R1-062574.

Motorola, "Downlink Acknowledgement and Group Transmit Indicator Channels", 3GPP TSG RAN WG1 Meeting #46bis, Oct. 9-13, 2006, pp. 1-4, Seoul, South Korea, R1-062625.

Motorola, "E-UTRA Uplink L1/L2 Control Channel Mapping", 3GPP TSG RAN WG1 Meeting #46bis, Oct. 9-13, 2006, pp. 1-6, Seoul, South Korea, R1-062626.

Texas Instruments, "Signaling and Feedback Requirements for Different Number of Codewords", 3GPP TSG RAN WG1 Meeting #46bis, Oct. 9-13, 2006, pp. 1-6, Seoul, South Korea, R1-062646.

Texas Instruments, "ACK/NAK Transmission without Reference Signal Overhead in E-UTRA Uplink", 3GPP TSG RAN WG1 Meeting #46bis, Oct. 9-13, 2006, pp. 1-10, Seoul, South Korea, R1-062658.

Ericsson, "Uplink non-data-associated control signaling—additional details", 3GPP TSG RAN WG1 Meeting #46bis, Oct. 9-13, 2006, pp. 1-3, Seoul, South Korea, R1-062868.

Ericsson, "Coding for ACK/NACK in MIMO operation", 3GPP TSG RAN WG1 Meeting #46bis, Oct. 9-13, 2006, pp. 1-2, Seoul, South Korea, R1-062879.

Ericsson, "MIMO HS-SCCH structure", 3GPP TSG RAN WG1 #47, Nov. 6-10, 2006, pp. 1-6, Riga, Latvia, R1-063548.

Ericsson, "MIMO impacts on MAC in HSPA", 3GPP TSG-RAN #56, Nov. 6-10, 2006, pp. 1-3, Riga, Latvia, Tdoc R2-063211.

Qualcomm Europe, "Considerations for Creating Performance Requirements for HSDPA MIMO", 3GPP TSG-RAN WG4 #39, May 8-12, 2006, pp. 1-3, Shanghai, China, R4-060487.

Lucent Technologies, "Text Proposal for the HSDPA Technical Report", TSG-RAN Working Group 1, Nov. 21-24, 2000, pp. 1-10, Stockholm, Sweden, TSGR1#17(00)1384.

Das, A. et al., "Design and Performance of Down Link Shared Control Channel for HSDPA", 2002, pp. 1088-1091, Lucent Technologies, Holmdel, NJ.

Kim, B. et al., "An HARQ scheme with antenna switching for V-BLAST system", Systemics, Cybernetics and Informatics, Jul. 2003, pp. 60-65, vol. 2, No. 6.

Lee, W. F., et al., "Defendant Apple Inc.'s P. R. 3-3 Invalidity Contentions", *Ericsson Inc. and Telefonaktiebolaget LM Ericsson v. Apple Inc.*, Civil Action No. 2:15-cv-287-JRG-RSP, United States District Court, Eastern District of Texas, Marshall Division, Jul. 20, 2015, pp. 1-511.

* cited by examiner

HARQ IN SPATIAL MULTIPLEXING MIMO SYSTEM

RELATED APPLICATIONS

This application is a continuation of U.S. patent application Ser. No. 13/246,530, filed on Sep. 27, 2011, which is a continuation of U.S. patent application Ser. No. 12/447,522, which is the National Stage of International Application PCT/SE2007/050782 filed Oct. 26, 2007, which claims the benefit of priority from foreign application SE 0602300-6 filed Oct. 31, 2006. The contents of each of the '530, '522, '782, and '300-6 applications are incorporated herein by reference in their entirety.

TECHNICAL FIELD

The present invention relates generally to wireless communications systems, and more particularly to the signaling of scheduling information in a spatial multiplexing wireless communications system utilizing re-transmissions for error control.

BACKGROUND

Over the last few decades, a wide variety of both wired and wireless telecommunication systems have been developed. Wireless telecommunication systems in particular have evolved through the so-called second generation (2G) systems into the third generation (3G) systems currently being deployed. Specifications for some 3G systems were developed by the 3rd Generation Partnership Project (3GPP); information regarding these may be found on the Internet at www.3gpp.org.

Continuing development of advanced wireless systems has produced techniques enabling even higher data transfer speeds. To this end, so-called High-Speed Downlink Packet Access (HSDPA) technology has recently been developed. HSDPA delivers packet data to a plurality of mobile terminals over a shared downlink channel at high peak data rates, and provides a smooth evolutionary path for 3G networks to support higher data transfer speeds.

HSDPA achieves increased data transfer speeds by defining a new downlink transport channel, the High-Speed Downlink Shared Channel (HS-DSCH), which operates in significantly different ways from other W-CDMA channels. In particular, the HS-DSCH downlink channel is shared between users, and relies on user-specific channel-dependent scheduling to make the best use of available radio resources. On a separate uplink control channel, each user device periodically transmits (e.g. as many as 500 times per second) an indication of the downlink signal quality. The Wideband-CDMA base station (Node B) analyzes the channel quality information received from all user devices to decide which users will be sent data on each 2-millisecond frame and, for each user, how much data should be sent in that frame. Using adaptive modulation and coding (AMC) techniques in addition to this frame-by-frame fast packet scheduling, more data can be sent to users which report high downlink signal quality. Thus, the limited radio resources are used more efficiently.

To support the newly defined HS-DSCH channel, three new physical channels are also introduced. First is the High-Speed Shared Control Channel (HS-SCCH), which is used to convey scheduling information to the user device. In essence, this scheduling information describes data that will be sent on the HS-DSCH two slots later. Second is the uplink High-Speed Dedicated Physical Control Channel (HS-DPCCH), which carries acknowledgement information transmitted by mobile terminals as well as current channel quality indicator (CQI) data for the user device. The CQI data is used by the Node B in its fast packet scheduling algorithms, i.e., in calculating how much data to send to the mobile terminal during the next transmission interval. Finally, a newly defined downlink physical channel is the High-Speed Physical Dedicated Shared Channel (HS-PDSCH), which is the physical channel carrying the user data of the HS-DSCH transport channel.

In addition to the fast packet scheduling and adaptive modulation and coding technologies discussed above, HSDPA further utilizes fast retransmissions for error control. In particular, HSDPA utilizes an error control method known as Hybrid Automatic Repeat Request, or HARQ. HARQ uses the concept of "incremental redundancy", where retransmissions contain different coding of the user data relative to the original transmission. When a corrupted packet is received, the user device saves it, sends a "NACK" message to trigger a re-transmission of the packet, and combines the saved packet with subsequent retransmissions to formulate an error-free packet as quickly and efficiently as possible. Even if the retransmitted packet(s) is itself corrupted, the combining of information from two or more corrupted transmissions can often yield an error-free version of the originally transmitted packet.

In fact, HARQ is a variation of Automatic Repeat-reQuest (ARQ) error control, which is a well-known error control method for data transmission in which the receiver detects transmission errors in a message and automatically requests a retransmission from the transmitter. HARQ gives better performance than ordinary ARQ, particularly over wireless channels, at the cost of increased implementation complexity.

The simplest version of HARQ, Type I HARQ, simply combines Forward Error Correction (FEC) and ARQ by encoding the data block plus error-detection information—such as Cyclic Redundancy Check (CRC)—with an error-correction code (such as Reed-Solomon code or Turbo code) prior to transmission. When the coded data block is received, the receiver first decodes the error-correction code. If the channel quality is good enough, all transmission errors should be correctable, and the receiver can obtain the correct data block. If the channel quality is poor and not all transmission errors can be corrected, the receiver will detect this situation using the error-detection code. In this case, the received coded data block is discarded and a retransmission is requested by the receiver, similar to ARQ.

In more advanced methods, incorrectly received coded data blocks are stored at the receiver rather than discarded, and when the retransmitted coded data block is received, the information from both coded data blocks are combined. When the transmitted and re-transmitted blocks are coded identically, so-called Chase combining may be used to benefit from time diversity. To further improve performance, incremental redundancy HARQ has also been proposed. In this scheme, retransmissions of a given block are coded differently from the original transmission, thus giving better performance after combining since the block is effectively coded across two or more transmissions. HSDPA in particular utilizes incremental redundancy HARQ, wherein the data block is first coded with a punctured Turbo code. During each re-transmission the coded block is punctured differently, so that different coded bits are sent each time.

ARQ schemes in general may be utilized in stop-and-wait mode (after transmitting a first packet, the next packet is not transmitted until the first packet is successfully decoded), or in selective repeat mode, in which the transmitter continues transmitting successive packets, selectively re-transmitting corrupted packets identified by the receiver by a sequence number. A stop-and-wait system is simpler to implement, but waiting for the receiver's acknowledgement reduces efficiency. Thus, in practice multiple stop-and-wait HARQ processes are often performed in parallel so that while one HARQ process is waiting for an acknowledgement one or more other processes can use the channel to send additional packets.

The first versions of HSDPA address up to 8 HARQ processes, numbered 0 through 7. This number is specified to ensure that continuous transmissions to one user may be supported. When a packet has been transmitted from the Node B, the mobile terminal will respond (on the HS-DPCCH) with an ACK (acknowledge) or NACK (not-ACK) indication, depending on whether the packet decoded correctly or not. Because of the inherent delay in processing and signaling, several simultaneous HARQ processes are required. The Node B transmitter thus is able to transmit several new packets before an ACK or NACK is received from a previous packet.

HSDPA as specified in 3GPP release 7 and forward is designed to achieve improved data rates of up to 28.8 Mbps. This is accomplished by introducing advanced multi-antenna techniques, i.e. Multiple-Input Multiple-Output (MIMO) technology. In particular, spatial multiplexing is employed to divide the data into two transmission streams, often called data substreams. These substreams are transmitted with multiple transmit antennas, using the same frequencies and the same channelization codes. Given uncorrelated propagation channels, receivers employing multiple receive antennas and using advanced detection techniques such as successive interference cancellation are able to distinguish between and decode the multiplexed data substreams.

With the addition of MIMO to HSDPA, the number of required HARQ processes increases, e.g. from 8 to 16 (0-15) processes. If the processes are independently numbered for each data substream and signaled to the receiving mobile terminals, the signaling load on the HS-SCCH will increase significantly. Instead of a 3-bit HARQ process number for identifying eight processes, a 4-bit HARQ process number is needed to distinguish between up to 16 processes. In a dual stream case, as currently under development for HSDPA systems, the signaling overhead would thus increase from three to eight bits (two streams at four bits/stream). Because signaling on HS-SCCH is relatively expensive, i.e., signaling bits are scarce, this increase in overhead is undesirable.

SUMMARY

The present invention provides methods and apparatus for signaling scheduling information in a spatial multiplexing wireless communications system, as well as corresponding methods and apparatus for processing such signaling information. The inventive techniques described herein facilitate efficient signaling of re-transmission process information, such as may be employed in a hybrid automatic repeat-request (HARQ) error control system.

An exemplary method for signaling scheduling information, such as might be implemented at a 3GPP W-CDMA Node B, comprises scheduling first and second transport blocks for simultaneous transmission during a first transmission interval on first and second data substreams, respectively. The first and second data substreams may correspond to primary and secondary data substreams of a 3GPP HSDPA dual-stream transmission. The exemplary method further comprises assigning a single re-transmission process identifier for the first transmission interval and transmitting first scheduling information for the first transmission interval, the first scheduling information comprising the re-transmission process identifier and first disambiguation data. The method further comprises scheduling at least one of the first and second transport blocks for re-transmission during a second transmission interval and transmitting second scheduling information for the second transmission interval, the second scheduling information comprising the re-transmission process identifier and second disambiguation data. The first and second disambiguation data indicate whether the re-transmission of the re-transmitted transport block is scheduled for the first or second data substream and may be used by a receiver to determine the same.

An exemplary method for processing scheduling information in a spatial multiplexing wireless communication system, such as might be implemented in a 3GPP-compliant mobile terminal, comprises receiving first scheduling information for a first transmission interval, the first scheduling information comprising a single re-transmission process identifier and first disambiguation data and receiving first and second transport blocks transmitted during the first transmission interval. The method further comprises receiving second scheduling information for a second transmission interval, the second scheduling information comprising the same re-transmission process identifier and second disambiguation data. Finally, the exemplary method comprises using the first and second disambiguation data to determine whether a re-transmitted transport block is scheduled for re-transmission on the first data substream or the second data substream during the second transmission interval.

The present invention may, of course, be carried out in other ways than those specifically set forth herein without departing from essential characteristics of the invention. Upon reading the following description and viewing the attached drawings, the skilled practitioner will recognize that the described embodiments are illustrative and not restrictive, and that all changes coming within the meaning and equivalency range of the appended claims are intended to be embraced therein.

DETAILED DESCRIPTION

The present invention will be described below with reference to the figures. Although the following description is primarily addressed to the application of the inventive techniques to a W-CDMA HSDPA system, those skilled in the art will appreciate that the methods and devices described herein may also be applied in other spatial multiplexing wireless communications systems, including other systems that may or may not employ CDMA technology. For example, 3GPP's Long-Term Evolution (LTE) initiative is currently specifying advanced $4^{th}$-generation wireless systems expected to support extremely high data rates (up to 100 Mbit/sec) using technologies such as Orthogonal Frequency Division Multiplexing (OFDM), adaptive modulation and coding, fast packet scheduling, HARQ, and MIMO. Those skilled in the art will appreciate that the inventive methods and apparatus described herein may readily be applied to LTE signaling, as well.

A primary difference between HARQ operation for MIMO and non-MIMO HSDPA is the fact that two parallel processes can be transmitted in dual-stream mode. Another difference is that a larger number of re-transmission process identifiers need to be addressed even if only a single transport block is transmitted. This is due to the rank adaptation that is present in the MIMO mode. Thus, when only single-stream transmission is used, the HS-SCCH needs to be able to signal any of the available HARQ processes, because an initial transmission might occur during dual-stream mode, followed by a re-transmission in single-stream mode. Accordingly, four HARQ process identifier bits are required in the single-stream format of the HS-SCCH.

Figure 1:
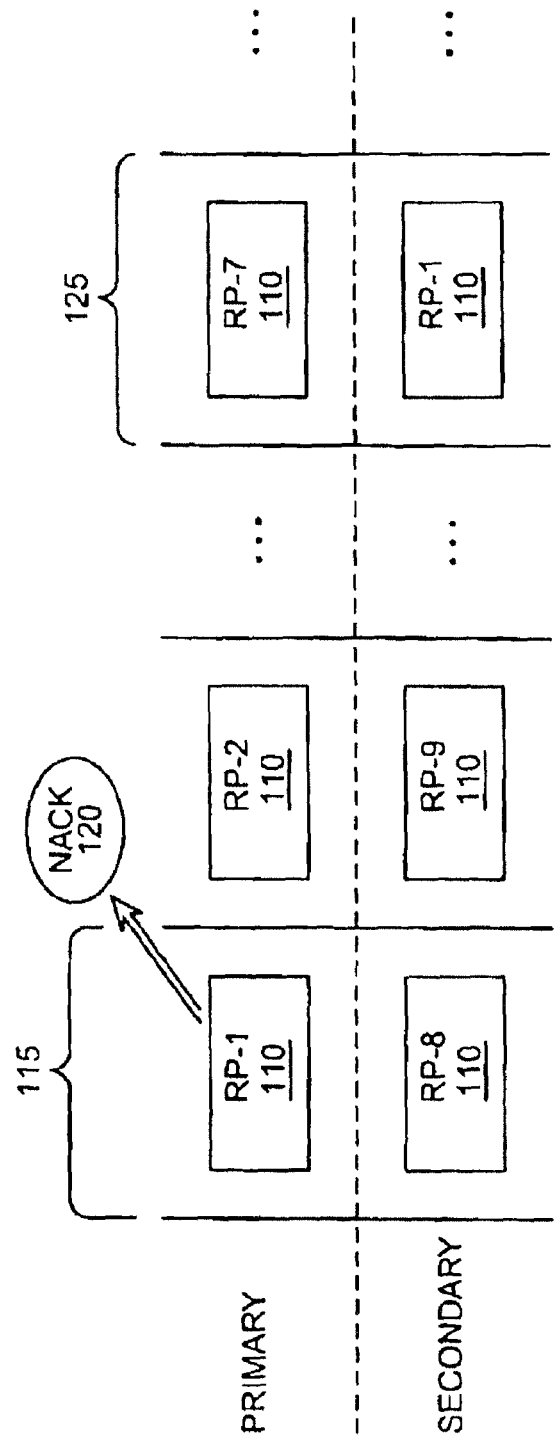
FIG. 1 illustrates dual-stream transmission of transport blocks according to one scheme for assigning re-transmission process identifiers.

For the dual-stream case, several approaches have been proposed. For complete flexibility, four bits per substream (in total eight bits) are needed for re-transmission process identification. It should be noted that if the quality of the two streams is varying over time, then the initial transmission of a packet may be on one substream (e.g., the primary substream, which has equal or higher-order modulation compared to the secondary substream), while retransmission may occur on the other (e.g., the secondary substream). This might happen, for example, if a new transport block with higher modulation order is scheduled for transmission during the same transmission interval as the re-transmitted transport block 110 This is shown in FIG. 1, which illustrates a dual-stream transmission scenario. Various transport blocks 110 associated with re-transmission process identifiers RP-1 RP-2, etc., are transmitted using a primary substream and a secondary substream. Thus, during a first transmission interval 115, transport blocks 110 associated with RP-1 and RP-8 are transmitted. To signal this scheduling, four re-transmission process identifier bits are sent on the HS-SCCH for each of the data substreams. In the example illustrated by FIG. 1, the transport block 110 associated with process identifier RP-1 is not decoded correctly Thus a NACK 120 is sent to the Node B, indicating that this transport block 110 should be re-transmitted. At a later transmission interval 125, the incorrectly decoded transport block 110 is rescheduled and transmitted using the secondary data substream, despite the fact that it was originally transmitted on the primary substream. However, because independent process identifier information is sent for each substream in the scheduling message corresponding to interval 125, the receiver is able to correctly match the re-transmitted transport block 110 to the original failed transmission. Data from the re-transmission may be combined with the originally received data to improve the probability that the re-transmitted transport block 110 is decoded correctly using incremental redundancy.

Although four bits per substream are required for maximum flexibility, fewer bits may be used if certain scheduling restrictions are accepted. For instance, one approach is to allocate a subset of the available HARQ process identifiers to each substream. For example, re-transmission process identifiers 0-7 could be associated with the primary substream, while identifiers 8-15 are used on the secondary. With this approach, only three bits for each substream might be used for signaling, thus saving two bits compared to the maximum-flexibility approach described above. On the other hand, this approach will impose some restrictions on the scheduler. If a given transport block 110 is initially transmitted on the primary substream (with a process identifier of 0-7), it may not be subsequently retransmitted on the secondary substream (process identifiers 8-15). Thus, a significant restriction is imposed, for a savings of only two bits. For example, referring once more to FIG. 1, it is now impossible to retransmit process RP-1 on the secondary stream during transmission interval 125, since this process "belongs" to the primary stream.

An improved signaling scheme requires only three re-transmission identifier bits on the HS-SCCH during dual stream transmission. In this approach, the total number of process identifiers are grouped into pairs (e.g, {0A,0B}, {7A, 7B}). A single process identifier is then associated with both substreams during a given transmission interval. The sub-pairs "A" and "B" are then coupled to the primary and secondary substreams, respectively. With this approach, only three bits per transmission interval are needed to signal a process identifier.

Figure 2:
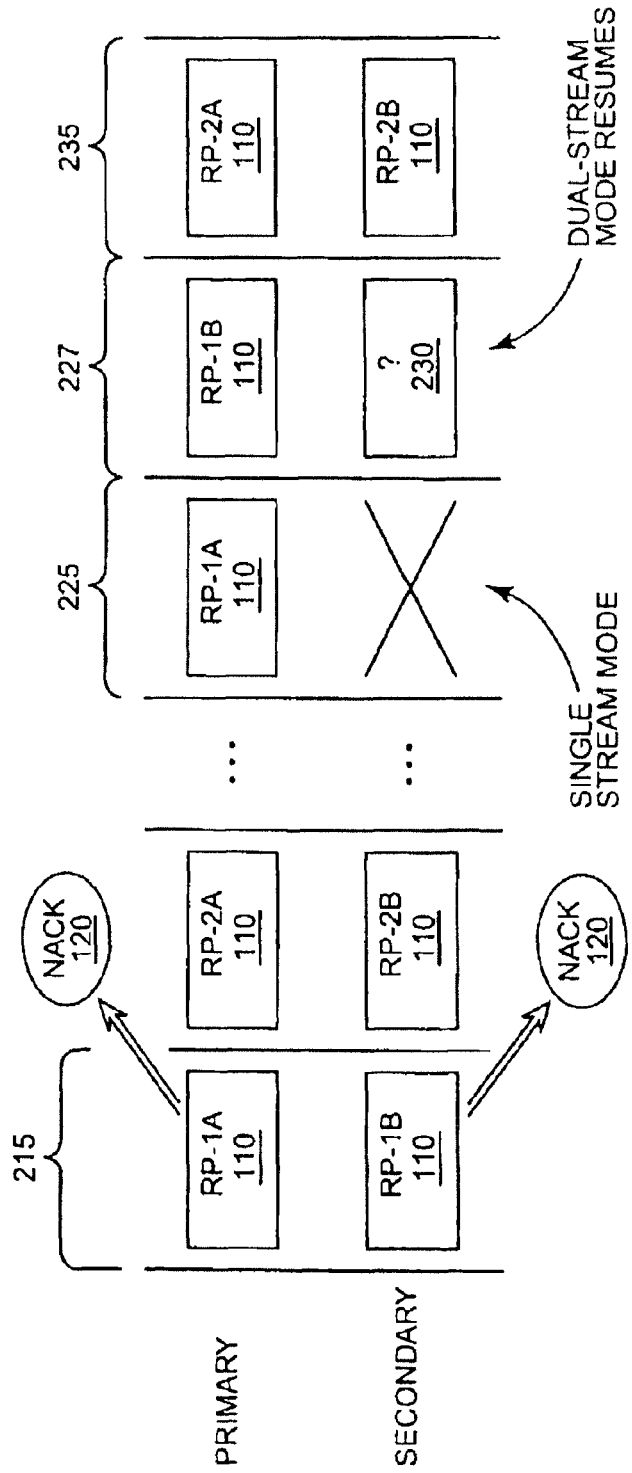
FIG. 2 illustrates dual-stream transmission of transport blocks and the assignment of re-transmission process identifiers according to one or more embodiments of the invention.

Although this approach yields reduced signaling, it also imposes restrictions on the scheduler. However these tend to arise only during special cases. An example of such a case is illustrated in FIG. 2. At a first time interval 215, transport blocks 110 are transmitted on the primary and secondary substreams and are associated with retransmission process identifiers RP-1A and RP-1B. If both transport blocks 110 are received with uncorrectable errors, NACKs 120 will be sent for each, and the Node B will attempt later to re-transmit both transport blocks 110. If channel conditions have changed in the meantime, only one stream may be available for transmission, so that the transport blocks 110 associated with process identifiers RP-1A and RP-1B must be transmitted serially, as shown at transmission intervals 225 and 227. Thus, as shown at transmission interval 225, the transport block 110 for process identifier RP-1A is transmitted on the primary substream, i.e., the only available stream for this interval. This is not in itself a problem, as four bits are used for signaling the process identifier in single-stream mode; the fourth bit may be used to distinguish between the "A" sub-process and the "B" sub-process. However, if channel conditions continue to change, such that both substreams are available for the second re-transmission interval 227, then channel capacity is wasted. Essentially, the capacity represented in FIG. 2 by transport block 230 is not available for new data. This is because sub-process RP-1A is still pending (since it was transmitted only one interval earlier) and cannot be re-used yet, since RP-1A must be coupled to RP-1B in dual-stream mode. Accordingly, transmission of a new transport block 110 (e.g., associated with process identifier RP-2A) must be delayed to the next transmission time interval 235.

Those skilled in the art will recognize that this pairing scheme, although only requiring a total of three re-transmission process identifier bits to be used during dual-stream mode, imposes certain additional scheduling limitations, unless the scheme is slightly modified. For example, if a given transport block 110 is initially transmitted on the primary substream, it cannot later be re-transmitted on the secondary substream, unless there is a signal to the receiver to indicate that the re-transmitted transport block 110 has "switched"

substreams. As was discussed above, under certain circumstances it may be desirable to permit scheduling re-transmissions on a different substream. Thus, disambiguation data must also be signaled to the receiver to resolve the potential ambiguity that arises when re-transmitted transport blocks 110 may be scheduled on either substream.

Fortunately, the basic scheme discussed above may be extended in at least two ways to provide this disambiguation data. First, an additional bit may be sent to indicate "orientation" of the sub-processes relative to the substreams. For instance, a "0" value for this bit may indicate that sub-process "A" is associated with the primary substream, while sub-process "B" is associated with the secondary substream. A "1" value would indicate the opposite association, i.e. that sub-process "B" is associated with the primary substream, and sub-process "A" with the secondary. (Those skilled in the art will appreciate that the identification of sub-processes is completely arbitrary; any self-consistent sub-process identification scheme will suffice.) With this approach, a receiver that fails to decode a given transport block 110 must save the process identifier (e.g., three bits for the example illustrated here) as well as this extra substream mapping bit. The receiver must also "remember" whether the failed transport block 110 was received on the primary or secondary substream. When the NACKed transport block 110 is re-transmitted (as indicated by the re-transmission of the corresponding process identifier on the HS-SCCH), the receiver simply compares the current value of the substream mapping bit to the previous value. If the value is the same, then the retransmitted transport block 110 is scheduled for the same substream as before. If the value has changed, then the re-transmitted transport block 110 is scheduled for the opposite substream.

An alternative way of describing this scheme is as follows. When two transport blocks 110 are transmitted simultaneously, the relationship between the transport blocks 110 and their respective re-transmission process identifiers is such that when the transport block 110 associated with process identifier HARQ_ID is mapped to the primary substream, then the transport block 110 mapped to the secondary substream is associated with the re-transmission process identifier: $(HARQ\_ID + N_{HARQ}/2) \mod(N_{HARQ})$, where $N_{HARQ}$ is the total number of HARQ processes. Thus, where 16 total HARQ processes are supported, re-transmission process identifier "0" is linked with process identifier "8", process identifier "1" is linked with process identifier "9" and so on. Likewise, process identifier "9" is linked with process identifier "1", identifier "10" with identifier "2", and identifier "15" with identifier "7".

Those skilled in the art will appreciate that only four bits need be signaled to uniquely identify the paired process identifiers. Those skilled in the art, upon further reflection, will also recognize that this is precisely the modified signaling scheme described earlier. Three of the four bits needed to signal the HARQ_ID values correspond directly to the three bits described earlier that uniquely identify the sub-process pairs {0A,0B}, . . . , {7A,7B}. The fourth bit corresponds directly to the substream mapping bit described above, and describes the orientation of the sub-processes relative to the primary and secondary substreams.

An alternative approach for sending the disambiguation data, i.e., signaling the sub-process-to-substream mapping, involves the use of implicit signaling. With this approach, an explicit substream mapping bit is not used. Rather, other signaling information that can be uniquely associated with the originally transmitted transport block 110 as well as with its re-transmissions can be used to determine whether the re-transmitted block is scheduled on the same or opposite data substream, compared to its original transmission. By comparing this other signaling information received at a retransmission interval with the corresponding information received at the original transmission interval, any ambiguity resulting from the re-mapping of the re-transmitted transport block 110 may be resolved.

In one embodiment of this approach, the transport block size associated with the transport block 110 is used to derive this implicit substream mapping data. Those skilled in the art will appreciate that transport blocks 110 having any of several different transport block sizes may be transmitted at any given transmission interval in an HSDPA system. This is principally because of the adaptive coding and modulation scheme used to match the coding to the channel condition. Because the receiver can "remember" the transport block size from an initial transmission of a transport block 110, the transport block size can be used to distinguish a re-transmitted transport block 110 from a transport block 110 transmitted along with the re-transmitted transport block, provided that the transport block 110 simultaneously transmitted on the other substream has a different transport block size.

Thus, using this implicit approach, only three signaling bits need be sent (for the case of 16 HARQ processes grouped into 8 pairs of sub-processes), with the substream mapping derived from the transport block size information. Those skilled in the art will appreciate that the transport block size may be signaled explicitly, as part of the scheduling data sent to the mobile terminal over the downlink control channel, or may be derived from other data, such as transport format data, that describes the modulation and coding for the transmission interval. As mentioned above, this approach also requires that a transport block 110 transmitted simultaneously with a re-transmitted block must have a different transport block size (from the re-transmitted block), so that the transport block 110 that comprises re-transmitted data can be identified. Furthermore, to provide for the situation where both transport blocks 110 in a given transmission interval are unsuccessfully decoded (and where both are re-transmitted together in a later interval), it may be desirable to require that every pair of simultaneously transmitted transport blocks 110 have different transport block sizes. With the flexibility afforded by the adaptive coding and modulation schemes, this may not be a particularly severe restriction under many system conditions and/or configurations.

Figure 3:
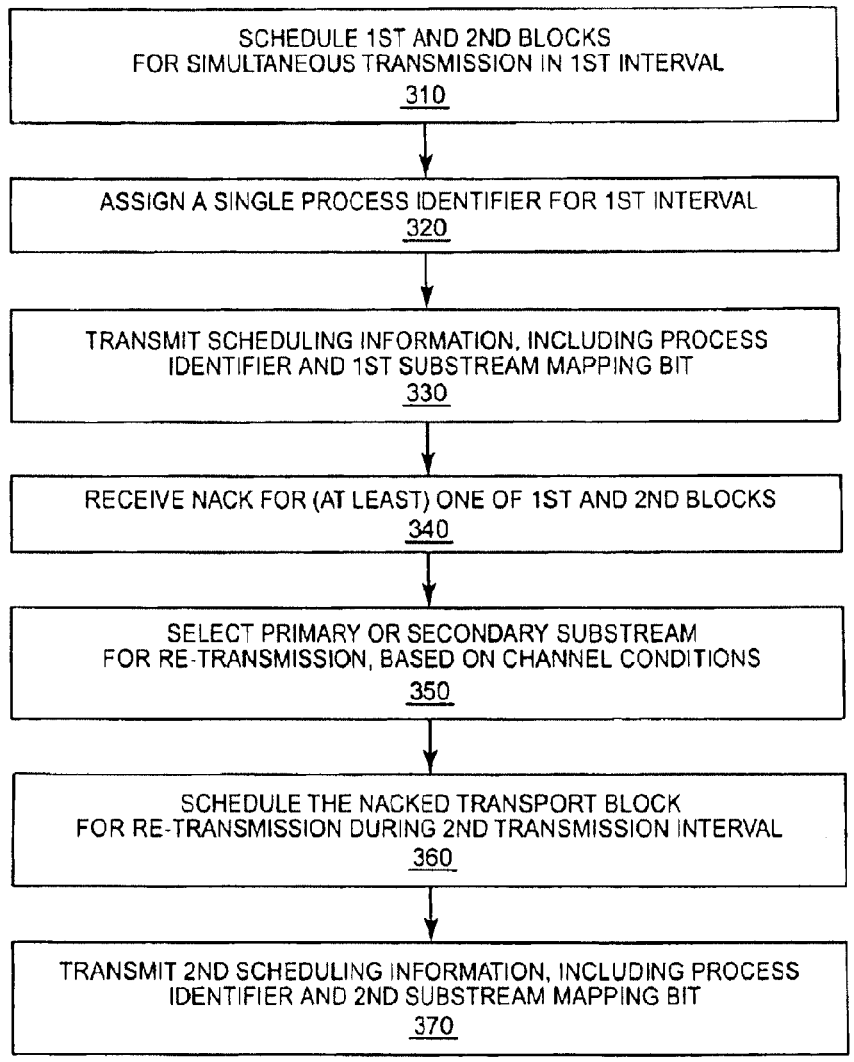
FIG. 3 illustrates an exemplary method for signaling scheduling information in a spatial multiplexing wireless communications system.

FIG. 3 thus illustrates a method for signaling scheduling information in a spatial multiplexing wireless communications system. The process begins with the scheduling of first and second transport blocks 110 for simultaneous transmission in a first transmission interval on a primary and secondary data substream, respectively. A single re-transmission process identifier is assigned for that transmission interval. Thus, a single re-transmission process identifier corresponds to both of the transport blocks 110 scheduled for that interval. In the exemplary HSDPA system described herein, the retransmission process identifier may comprise a 3-bit datum, supporting 8 unique process identifiers.

At block 330, scheduling information corresponding to the first transmission interval is sent to the receiver over the downlink control channel (e.g., the HSDPA HS-SCCH). This scheduling information includes the re-transmission process identifier as well as disambiguation data for use in tracking the mapping of transport blocks 110 to the primary and secondary substreams. In the method illustrated in FIG. 3, this disambiguation data comprises a single substream mapping bit.

At block 340, a NACK is received for at least one of the first and second transport blocks 110 sent during the first interval.

Those skilled in the art will appreciate that this NACK may be received several transmission time intervals after the first interval, due to signal propagation and processing delays. In response to the NACK, the Node B must re-schedule the NACKed transport block 110 (or blocks) for a subsequent interval.

Under some circumstances, the NACKed transport block 110 will be scheduled for the same substream as was used for the original transmission. However, in other circumstances it may be desirable to switch substreams for the re-transmission of the NACKed transport block 110. Thus, at block 350, the primary or secondary substream is selected for re-transmission of the NACKed transport block, based, inter alia, on the then-current channel conditions. Then, at block 360, the NACKed transport block 110 is scheduled for re-transmission, on the selected substream, during a second transmission interval.

Scheduling information for the second transmission interval is sent at block 370. This scheduling information includes a re-transmission process identifier that is identical to the identifier sent for the first transmission interval, thus signaling to the receiver that at least one of the data substreams carries a re-transmitted transport block 110. In addition, the scheduling information includes disambiguation data, in this case a second substream mapping bit, which may be used by the receiver to determine which substream carries the re-transmitted transport block 110.

Those skilled in the art will appreciate that the scheduling information may include other signaling data for use by the receiver, including, for example, re-transmission version information for use in incremental redundancy processing. The scheduling may also include transport format data, which may explicitly identify a transport block size for each of the data substreams, or may alternatively define the modulation and coding schemes in such a manner that the receiver may derive the transport block sizes.

Figure 4:
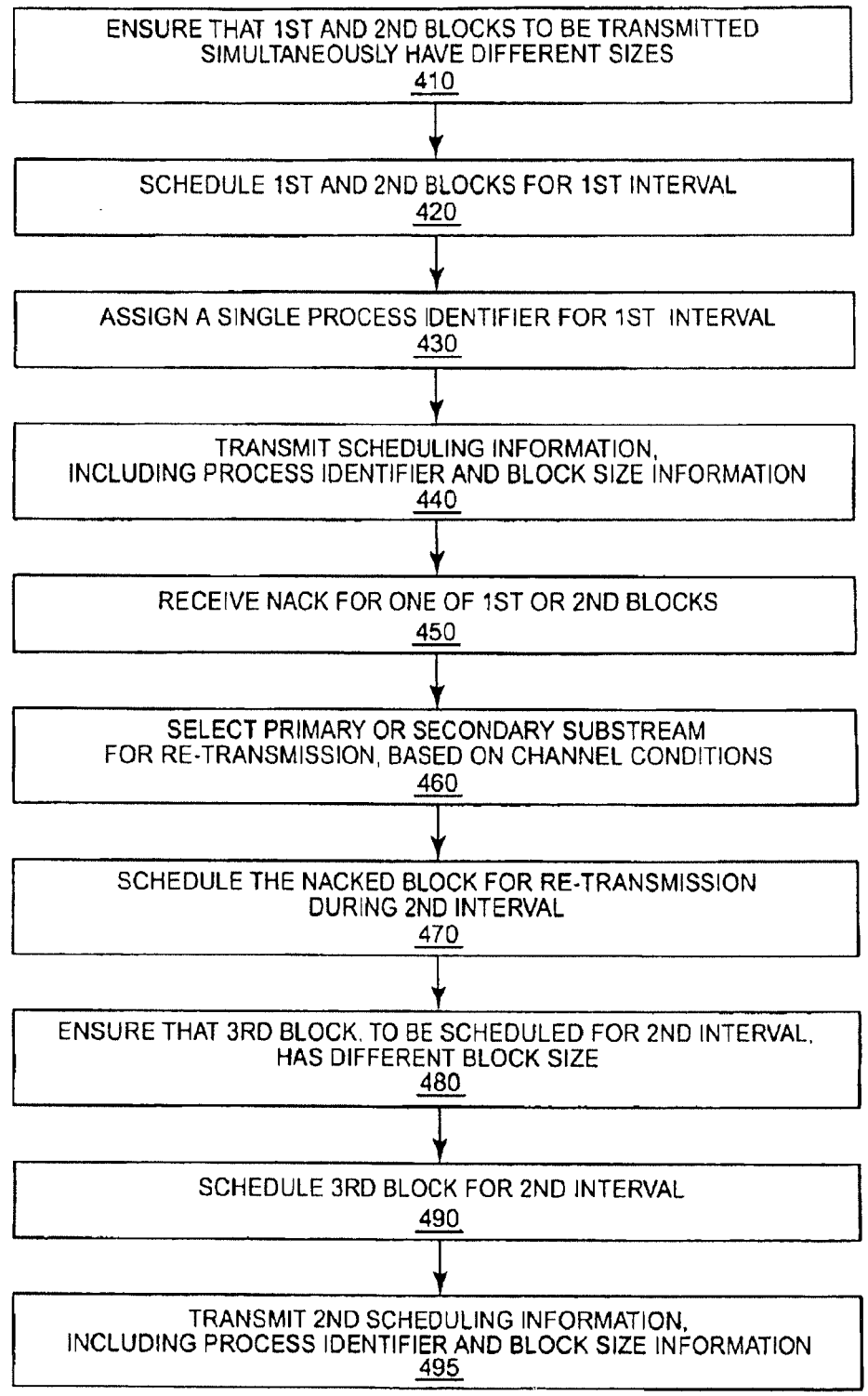
FIG. 4 illustrates another exemplary method for signaling scheduling information in a spatial multiplexing wireless communications system.

As was demonstrated above, transport block size information may serve as disambiguation data in place of an explicit substream mapping bit. An exemplary method employing this approach is illustrated in FIG. 4.

At block 410, the transmitting node (e.g., a W-CDMA HSDPA Node B) ensures that first and second transport blocks 110 to be scheduled for simultaneous transmission have different transport block sizes. In many cases, this will naturally be the case, but it might need to be forced in others. Forcing the transport block sizes to differ will enable later disambiguation of substream mapping in the event that both transport blocks 110 fail to decode successfully and must be re-transmitted later.

At block 420, the first and second transport blocks 110 are scheduled for a first transmission interval. As with the previously described method, a single re-transmission process identifier is assigned to the first transmission interval, at block 430. Likewise, scheduling information, including the re-transmission process identifier, is transmitted to the receiving node (e.g. a 3G mobile terminal) at block 440. However, in this example, an explicit substream mapping bit is not sent as part of the scheduling information. Rather, in the event that later disambiguation is needed, i.e., in the event that a re-transmission is required, the transport block size corresponding to the re-transmitted transport block 110 is used to determine which substream was used for the retransmission. Thus, the scheduling information transmitted at block 440 includes block size information for each of the transmitted transport blocks 110. As noted earlier, this block size information may comprise explicit transport block size data, or it may be implicit in other transport format data included in the scheduling message.

At block 450, the Node B receives a NACK corresponding to one of the first and second transport blocks 110 transmitted during the first interval, indicating that the NACKed transport block 110 must be re-transmitted at a later interval. Accordingly, the primary or secondary substream is selected for re-transmission of the NACKed transport block, based on channel conditions, at block 460, and the NACKed transport block 110 is scheduled for re-transmission during a second transmission interval (which may actually be several intervals after the first transmission interval), on the selected substream, at block 470.

In the event that only one of the originally transmitted first and second transport blocks 110 was unsuccessfully decoded, and is thus scheduled for re-transmission in the second interval, an additional transport block, comprising new data, may be scheduled for transmission along with the re-transmitted transport block 110 during the second transmission interval. Thus, at block 480, a third transport block 110 is selected, such that its transport block size differs from the NACKed transport block 110. This third transport block 110 is scheduled for the second transmission interval at block 490.

Finally, at block 495, scheduling information corresponding to the second transmission interval is sent to the receiving node. This scheduling information includes the same process identifier as was sent with the earlier scheduling information. In addition, this scheduling information includes transport block size information for each of the scheduled transport. The receiver may use the transport block size information to determine which of the substreams carries the re-transmitted transport block, and which carries the new transport block 110.

Those skilled in the art will appreciate that corresponding methods for processing the transmitted scheduling information are performed at the receiving node, e.g., at the W-CDMA HSDPA mobile terminal. Exemplary methods for receiver processing are thus illustrated in FIGS. 5 and 6, and briefly described below.

Figure 5:
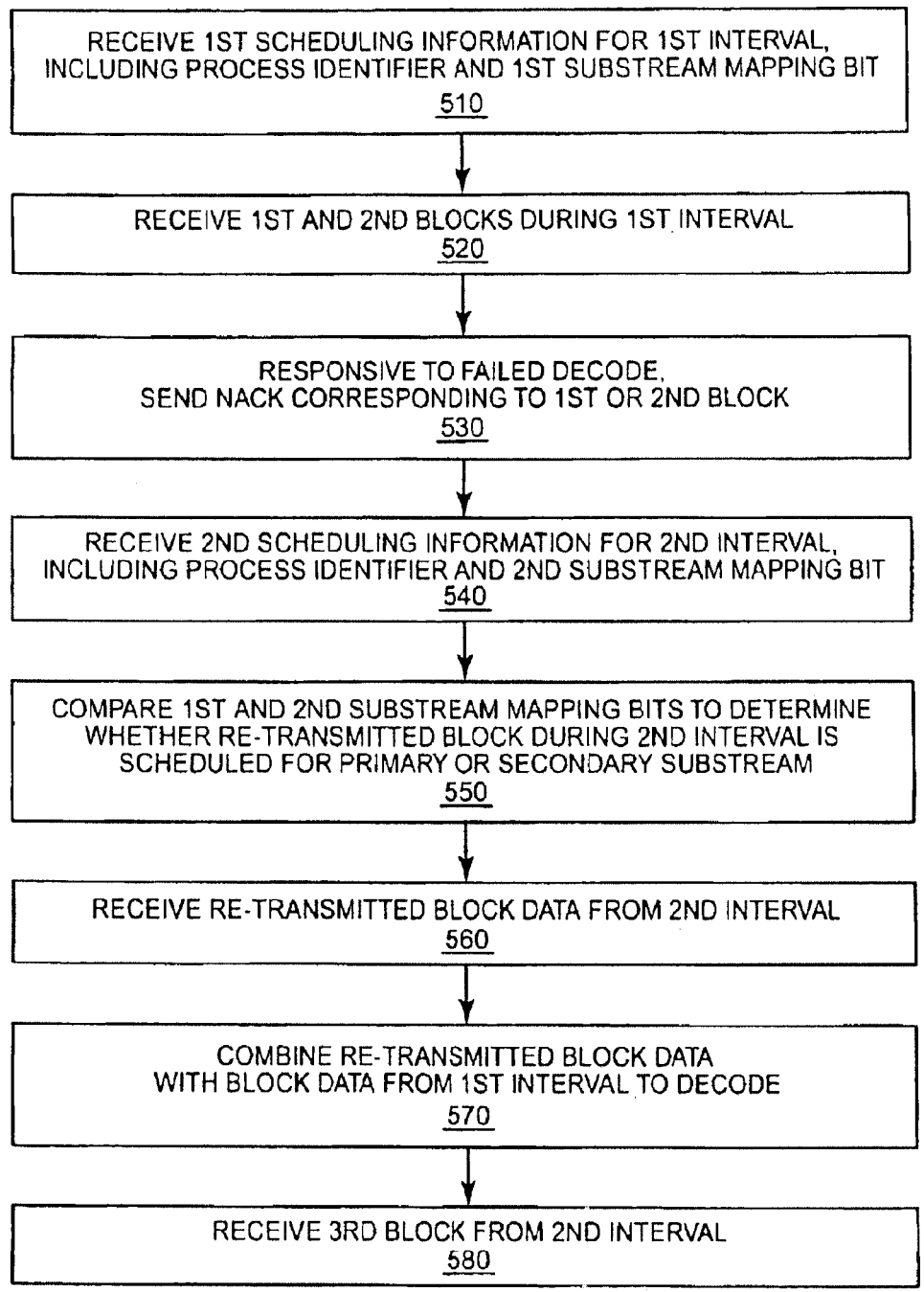
FIG. 5 illustrates an exemplary method for processing scheduling information in a spatial multiplexing wireless communications system.

FIG. 5 illustrates an exemplary processing method in which the transmitted scheduling information comprises an explicit substream mapping bit in addition to the retransmission process identifier. At block 510, scheduling information corresponding to a first transmission interval is received. This information may be received from, e.g., a downlink control channel such as the HSDPA HS-SCCH. The scheduling information includes a re-transmission identifier (e.g. a 3-bit identifier), as well as a substream mapping bit. At block 520, first and second transport blocks 110 scheduled for the first transmission interval are received, on the primary and secondary substreams, respectively.

At block 530, in response to an unsuccessful decode of one of the blocks, a NACK message is sent to the transmitting node (e.g. the Node B). Shortly afterwards, another scheduling message is received, comprising scheduling information for a second transmission interval during which the NACKed transport block 110 is scheduled to be transmitted. This scheduling information includes the same process identifier as was received for the first transmission interval, as well as a substream mapping bit. Because the receiver sent the earlier NACK message, and is thus "expecting" a retransmission, the appearance of the same process identifier signals to the receiver that the re-transmitted block is scheduled for the second transmission interval. Those skilled in the art will recognize that the appearance of the same process identifier is not a perfectly reliable indicator of a re-transmission, as the Node B may have misinterpreted a NACK as an ACK and may actually be sending new data. An HSDPA receiver can detect this situation by examining the re-transmission sequence number, or RSN, for each substream; an RSN of zero indicates new data, while other values indicate redundancy versions in a pre-determined incremental redundancy scheme.

In any event, once the receiver has determined that a re-transmitted transport block 110 is scheduled for the second interval, it must then determine whether the re-transmitted block 110 is scheduled for the primary or secondary substream. The substream mapping bit corresponding to the second transmission interval may differ from the mapping bit sent for the first interval. Accordingly, at block 550, the earlier substream mapping bit is compared to the newly-received mapping bit to determine whether the re-transmitted transport block 110 is scheduled for the same substream as it was earlier received on, or whether it has been scheduled for the other substream. In an exemplary embodiment, if the mapping bits are identical for the first and second transmission intervals, then the re-transmitted transport block 110 will be transmitted on the same substream as before. If the mapping bits differ, then the re-transmitted transport block 110 will appear on the opposite substream, compared to the original transmission.

At block 560 then, re-transmitted block data is retrieved from the appropriate substream during the second transmission interval. This data is combined, at block 570, with the corresponding block data from the first transmission interval using e.g., Chase combining or incremental redundancy to improve the probability of successful decoding. At block 580, a new transport block, which was scheduled for transmission along with the re-transmitted block, is also received from the second transmission interval.

Figure 6:
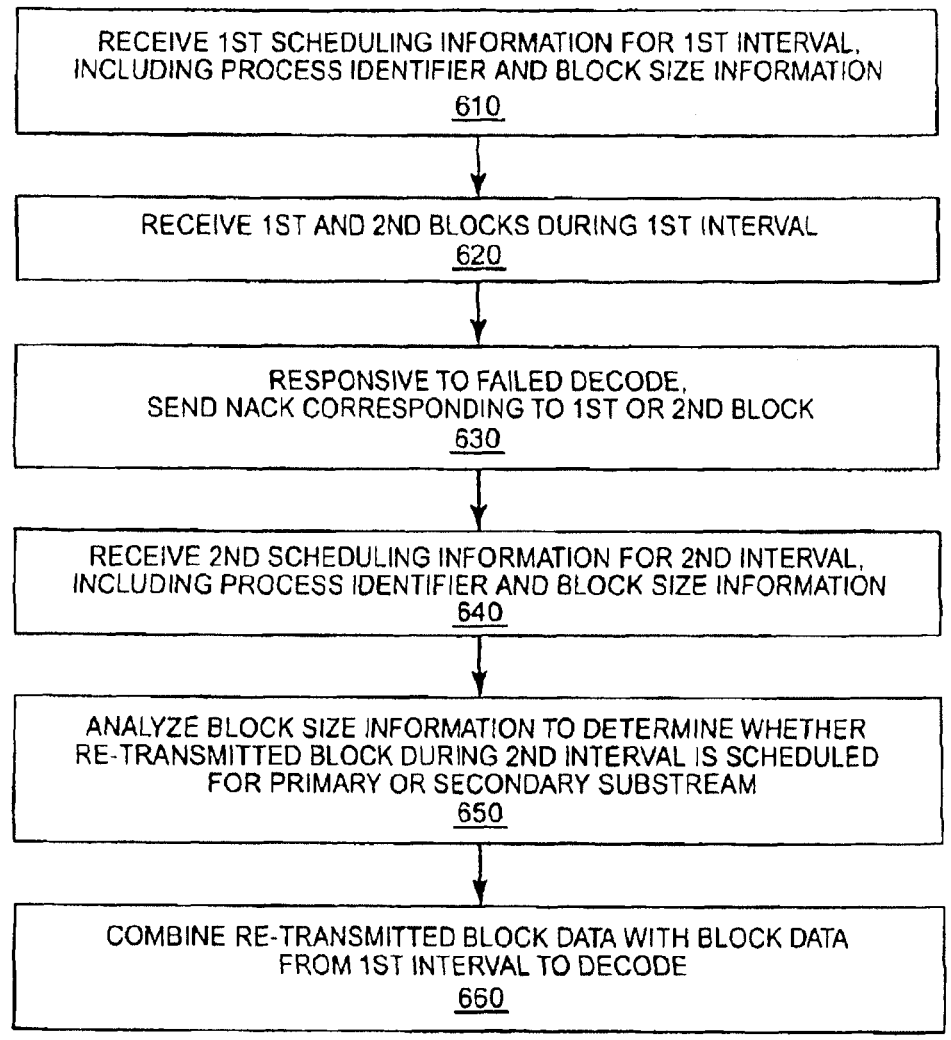
FIG. 6 illustrates another exemplary method for signaling scheduling information in a spatial multiplexing wireless communications system.

In the exemplary method illustrated in FIG. 6, scheduling information corresponding to a first transmission interval is received, at block 610 In this example, the scheduling information does not include an explicit substream mapping bit, but instead includes block size information. Again, the block size information may be explicit, or may be implicit in transport format information defining the modulation and coding schemes used for each substream during the interval.

At block 620, first and second transport blocks 110 transmitted during the first interval are received. As with the previous method, in response to a failed decode attempt for one of the blocks, a NACK is sent to the transmitting node, at block 630. Subsequently, a second scheduling message, corresponding to a second transmission interval, is received, the scheduling message comprising the same process identifier received for the first transmission interval. The second scheduling message further comprises block size information. In this embodiment, the receiver analyzes the block size information to determine whether the re-transmitted transport block 110 is scheduled for the primary substream or the secondary substream. Typically, the scheduling message comprises separate transport format data for each substream. From this transport format data, the transport block size corresponding to each substream may be derived. When the decoding of a transport block 110 fails, the receiver saves information indicating which substream the failed transport block 110 was received on. Thus, when the transport block 110 is re-transmitted in a later interval, the receiver can distinguish the re-transmitted transport block 110 from a simultaneously transmitted transport block 110 by comparing transport block size information for each of the newly-received transport blocks 110 to the saved information.

Once the receiver has determined which substream carries the re-transmitted transport block, re-transmitted block data may be received during the second transmission interval, and combined with block data saved from the first transmission interval, to decode the re-transmitted block. This is shown at block 660.

Figure 7:
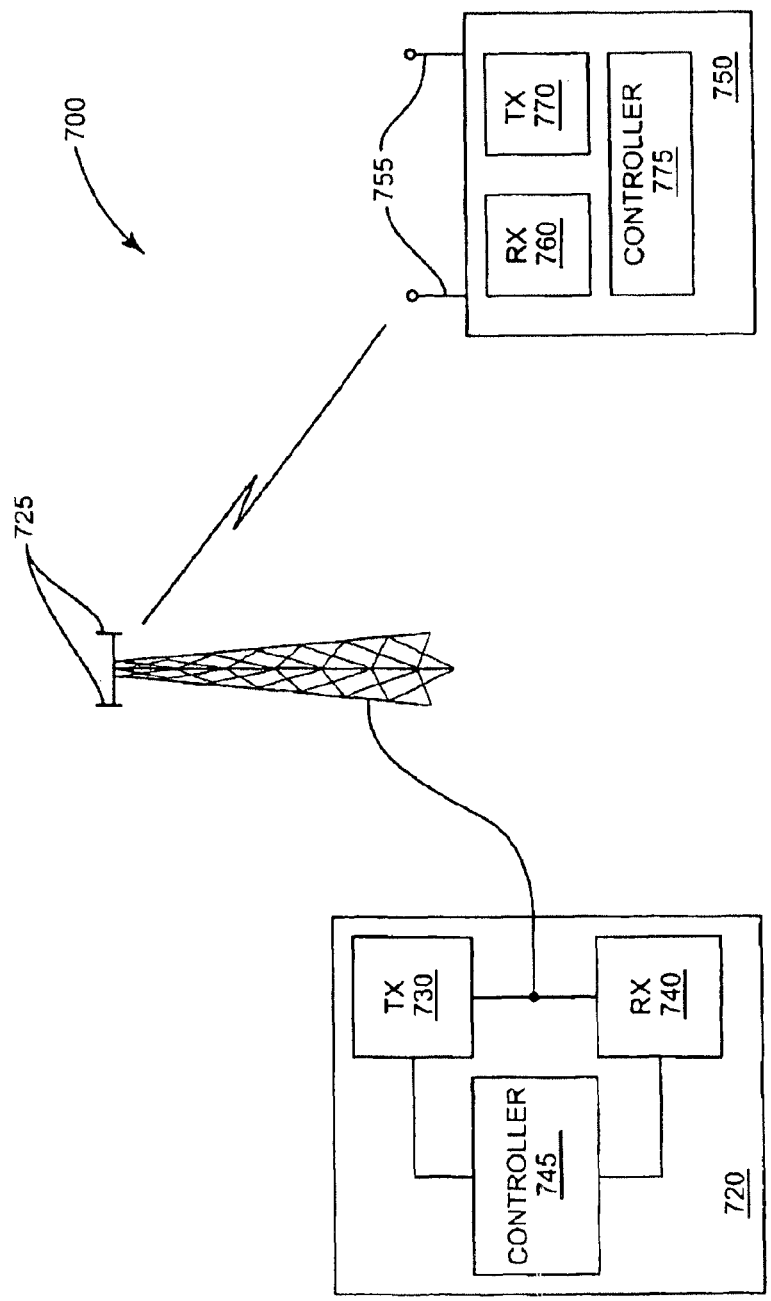
FIG. 7 illustrates one embodiment of a spatial multiplexing wireless communications system.

An exemplary spatial multiplexing wireless communications system is illustrated in FIG. 7. Wireless communications system 700, which may comprise a W-CDMA HSDPA system utilizing MIMO technology, comprises a base station 720, communicating with mobile terminal 750, using two or more base station antennas 725 and two or more mobile terminal antennas 755. Base station 720 comprises a transmitter subsystem 730, which is configured to perform fast packet scheduling, base-station receiver 740, and base-station controller 745. Exemplary mobile terminal 750 comprises a receiver subsystem 760, a mobile transmitter section 770, and mobile terminal controller 775.

Transmitter subsystem 730 is configured to carry out one or more of the methods described herein, or variants thereof, for signaling scheduling information in a spatial multiplexing wireless communications system, such as wireless communications system 700. In particular, transmitter subsystem 730 may be configured to schedule first and second transport blocks 110 for simultaneous transmission during a first transmission interval on a primary and a secondary data substreams, respectively, and to transmit first scheduling information for the first transmission interval, the first scheduling information comprising a single re-transmission process identifier as well as first disambiguation data. Transmitter subsystem 730 may be further configured to schedule the second transport block 110 for re-transmission during a second transmission interval, and to transmit second scheduling information for the second transmission interval, the second scheduling information comprising the same re-transmission process identifier as well as second disambiguation data. As described in more detail above, the first and second disambiguation data indicate whether the re-transmission of the second transport block 110 is scheduled for the primary or secondary data substream. Thus, in some embodiments, the first and second disambiguation data each comprise an explicit substream mapping bit, the values of which may be compared to determine whether the re-transmitted transport block 110 is scheduled for the same or a differing substream from which was used for the original transmission. In other embodiments, the substream mapping is implicit, and is derived from transport block size information included in the first and second scheduling information. In the latter embodiments in particular, the transmitter subsystem may be configured to ensure that the first and second transport blocks 110 have differing transport block sizes and may be further configured to ensure that the re-transmitted transport block 110 has a different transport block size than a third transport block 110 transmitted during the second transmission interval along with the re-transmitted block.

In some embodiments, re-transmission of a transport block 110 by transmitter subsystem 730 is triggered by receipt of a NACK message, which may be received by base-station receiver 740 and relayed to transmitter subsystem 730 via base-station controller 745.

Receiver subsystem 760 is configured to carry out one or more of the methods described herein, or variants thereof, for processing scheduling information in a spatial multiplexing wireless communications system, such as wireless communications system 700. In particular, receiver subsystem 760 may be configured to receive first and second transport blocks 110 simultaneously transmitted during a first transmission interval on primary and secondary data substreams, after receiving scheduling information for the first transmission interval. The received scheduling information includes a single re-transmission process identifier and first disambiguation data. In some embodiments, receiver subsystem 760 is configured to generate and send a negative acknowledgement (NACK) to mobile controller 775, which relays the NACK to mobile transmitter 770 for transmission to base station 720. The NACK indicates that at least one of the first and second transport blocks 110 transmitted during the first transmission interval was received with errors. In any event, receiver subsystem 760 subsequently receives second scheduling information for a second transmission interval, the second scheduling information including the same re-transmission process identifier along with second disambiguation data. Finally, receiver subsystem 760 is configured to use the first and second disambiguation data to determine whether a re-transmitted transport block 110 is scheduled for re-transmission on the primary data substream or the secondary data substream during the second transmission interval.

In some embodiments, the disambiguation data comprises a first and second substream mapping bit, corresponding to the first and second transmission intervals, and the receiver subsystem 760 is configured to compare the first and second substream mapping bits to determine whether the re-transmitted transport block 110 is scheduled for re-transmission on the primary data substream or the secondary data substream during the second transmission interval. In other embodiments, the disambiguation data comprises transport block size information corresponding to the re-transmitted transport block, and the receiver subsystem 760 is configured to determine whether the retransmitted transport block 110 is scheduled for re-transmission on the primary data substream or the secondary data substream during the second transmission interval by determining whether the transport block size information corresponds to the primary or secondary data substream during the second transmission interval.

In some embodiments, receiver subsystem 760 is configured to receive a third transport block 110 transmitted simultaneously with the re-transmitted transport block 110 during the second transmission interval; in these embodiments the disambiguation data is used further to determine whether the third transport block 110 is scheduled for the primary or secondary substream.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method for receiving a dual stream transmission in a system employing Hybrid Automatic Repeat Request (HARQ) retransmission, wherein HARQ process identifiers are grouped into pairs of sub-process identifiers, such that each sub-process is identifiable by a four-bit address, and wherein three bits have identical values in both sub-processes in a pair, and wherein one bit indicates which sub-process is transmitted on which stream, the method comprising:
   receiving four bits corresponding to a single sub-process address;
   receiving a first transport block with a first sub-process on a first stream, and a second transport block with a second sub-process on a second stream; and
   determining, based on the single sub-process address and a pairing of sub-process identifiers, which sub-process is transmitted on which stream.

2. The method according to claim 1, wherein the dual stream transmission is a MIMO transmission.

3. The method according to claim 1, further comprising:
   transmitting a negative acknowledgement for one of the first and second transport blocks; and
   receiving a retransmission of the one of the first and second transport blocks on a same or a different stream.

4. A user equipment configured to receive a dual stream transmission in a system employing Hybrid Automatic Repeat Request retransmission, wherein HARQ process identifiers are grouped into pairs of sub-process identifiers, such that each sub-process is identifiable by a four-bit address, and wherein three bits have identical values in both sub-processes in a pair, and wherein one bit indicates which sub-process is transmitted on which stream, the user equipment comprising:
   a processing circuit; and
   a receiver operatively connected to the processing circuit and configured to:
      receive four bits corresponding to a single sub-process address;
      receive a first transport block with a first sub-process on a first stream, and a second transport block with a second sub-process on a second stream; and
      determine, based on the single sub-process address and a pairing of sub-process identifiers, which sub-process is transmitted on which stream.

5. The user equipment according to claim 4, wherein the dual stream transmission is a MIMO transmission.

6. The user equipment according to claim 4, further comprising:
   a transmitter configured to transmit a negative acknowledgement for one of the first and second transport blocks; and
   wherein the receiver is further configured to receive a retransmission of the one of the first and second transport blocks on a same or a different stream.

7. A method for transmitting a dual stream transmission in a system employing Hybrid Automatic Repeat Request (HARQ) retransmission, wherein HARQ process identifiers are grouped into pairs of sub-process identifiers, such that each sub-process is identifiable by a four-bit address, and wherein three bits have identical values in both sub-processes in a pair, and wherein one bit indicates which sub-process is transmitted on which stream, the method comprising:
   transmitting four bits corresponding to a single sub-process address;
   transmitting a first transport block with a first sub-process, identifiable by the single sub-process address, on a first stream; and
   transmitting a second transport block with a second sub-process on a second stream, wherein the first and second sub-processes belong to a same pair.

8. The method according to claim 7, wherein the dual stream transmission is a MIMO transmission.

9. The method according to claim 7, further comprising:
   receiving a negative acknowledgement for one of the first and second transport blocks; and
   retransmitting the one of the first and second transport blocks on a same or a different stream.

10. A NodeB configured to transmit a dual stream transmission in a system employing Hybrid Automatic Repeat Request (HARQ) retransmission, wherein HARQ process identifiers are grouped into pairs of sub-process identifiers, such that each sub-process is identifiable by a four-bit address, and wherein three bits have identical values in both sub-processes in a pair, and wherein one bit indicates which sub-process is transmitted on which stream, the NodeB comprising:
   a processing circuit; and
   a transmitter operatively connected to the processing circuit and configured to:
      transmit four bits corresponding to a single sub-process address;
      transmit a first transport block with a first sub-process, identifiable by the single sub-process address, on a first stream; and
      transmit a second transport block with a second sub-process on a second stream, wherein the first and second sub-processes belong to a same pair.

11. The NodeB according to claim 10, wherein the dual stream transmission is a MIMO transmission.

12. The NodeB according to claim 10, further comprising:
   a receiver configured to receive a negative acknowledgement for one of the first and second transport blocks; and
   wherein the transmitter is further configured to retransmit the one of the first and second transport blocks on a same or a different stream.

* * * * *